Dec. 1, 1936.  L. F. BRAGA  2,062,804
AUTOMATIC GOVERNOR FOR MOTORS, RESPONSIVE TO THE RESISTANT TORQUE
Filed July 30, 1934
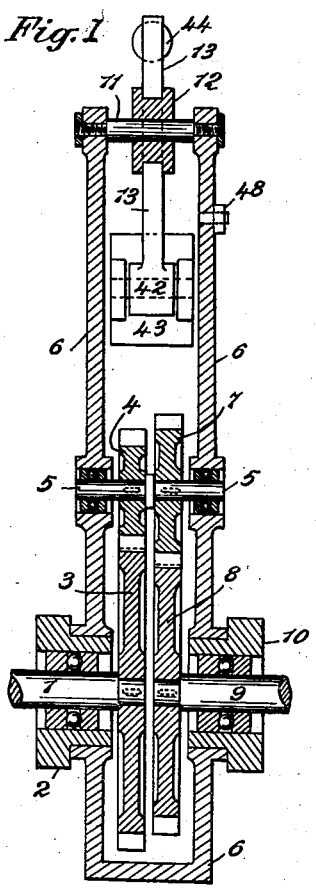
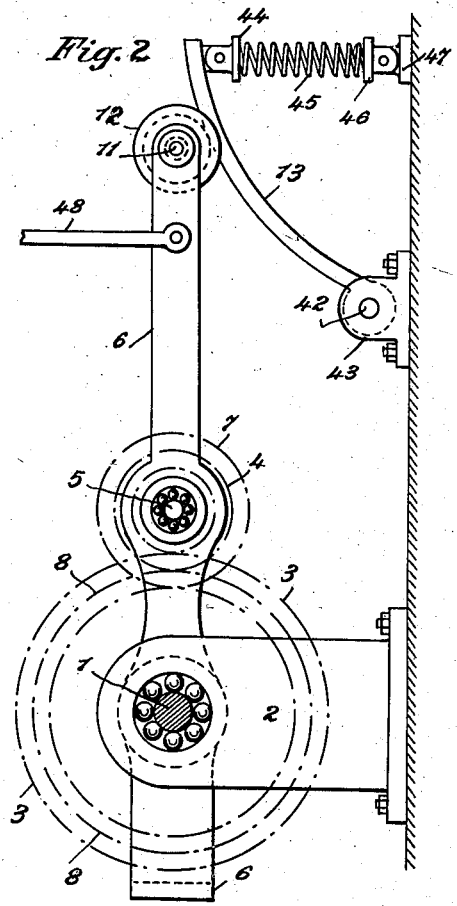

Patented Dec. 1, 1936

2,062,804

UNITED STATES PATENT OFFICE 2,062,804

AUTOMATIC GOVERNOR FOR MOTORS, RESPONSIVE TO THE RESISTANT TORQUE

Luigi Filippo Braga, Rome, Italy

Application July 30, 1934, Serial No. 737,681
In Germany August 3, 1933

3 Claims. (Cl. 74—411)

This invention relates to a device for controlling the operation of a motor in dependence on the load torque, the device actuating suitable motor-control members.

More particularly, my invention relates to an automatic governor for motors, which governor is responsive to the load torque, and which comprises an epicyclic gear train disposed between an engine and a driven shaft in such manner that either all or a part of the energy to be supplied from the engine to the driven shaft is transmitted between the first and second ones of the three characteristic elements of the epicyclic gear train, this transfer being at a transmission ratio which is different from that of the unit. The third characteristic element of this epicyclic gear train which element may be the carrier or the first or second wheel, operates on the controls of the motor.

First of all, I will briefly define some of the terms which I will use.

In the present description by "epicyclic gear train", I mean a system of several shafts bearing tooth wheels which are always in engagement, at least one of the shafts (with relative tooth wheels) being rotatable around a fixed axle which is coaxial with one of the other shafts of the system. I also use the same term when one or more of the tooth wheels is substituted by chains or belts or other connecting member securing uninterrupted transmission of the rotary motion from one shaft to another.

By "carrier" I mean that member of the "epicyclic gear train" which carries the movable shaft or shafts around the said fixed axle.

By "planet wheels" of the "epicyclic gear train" are meant the tooth wheels or their equivalent carried by the movable shafts.

The following modifications of the invention are disclosed only by way of example.

Of course the particulars of practical execution as illustrated in the accompanying drawing, the exact type of the devices and elementary parts, the shape, dimensions, arrangement, application, number of parts, initial material products and so on, may be modified according to circumstances without going beyond the scope of the patent.

In the accompanying drawing:

Fig. 1 illustrates a governor according to my invention.

Fig. 2 is a side view of Fig. 1.

It is fundamental that the purpose of an automatic control is different in the case where the maximum torque produced by the motor is always greater than the resistant torque of the load from the purpose in the case where the maximum developed torque is sometimes less than the torque of the load.

In the first of the two suggested cases, a condition usually maintaining in fixed motor installations, the automatic control maintains the operation of the motor constant by varying its power in dependence on the load demand. In this case the governor is usually speed-responsive.

This governor controls, either directly or by means of servo-motors, the position of the supply nozzles of the turbines or the size of the intake port openings of combustion motors or steam engines. In general, it controls the position of the members which vary the power developed by the motor.

On the contrary, my new governor is responsive to the variation of the torque transmitted between two rotating shafts, the governor thus being capable, when the developed torque is a direct or indirect function (as shown in the examples) of the load on the motor, of serving as a substitute for the conventional centrifugal governor. And since as a practical matter it can develop a much larger power than the conventional installations, it can replace in a large number of instances even the servo-motors.

In the second of the two above cases, exemplified by traction motors, the governor serves to modify the transmission ratio between the driving shaft and the wheels of the vehicle in dependence on the load encountered. In this case the governor, when combined with a progressively variable speed gear as better explained hereinafter, permits of a particularly simple solution of the problem.

Automatic governor according to my invention for keeping the speed of a motor constant under variable load.

(A) The governor is placed between the motor and driven machine, and also functions as a speed reducer.

This arrangement is especially suitable for high speed motors (steam turbines, combustion motors) which are of comparatively low power output, for use in fixed installation controlling a series of machines.

In these installations between the driving shaft and the intermediate gearing of the operating machines there is always inserted a speed reducer, which can be advantageously replaced by my new governor, this governor in this case serving the double function of a speed regulator and a speed reducer.

An important feature of this arrangement is that it suppresses nearly completely all local and transient disturbances, the governor responding to the variations in load and immediately acting on the throttling members before any appreciable speed variations can occur.

Another feature is the realization of both astatic regulation (the speed of the operation being independent of the load) and static regulation (speed of operation depending on the load).

When (for example in combustion motors) the reaction of the torque-regulating members is either zero or nearly zero, it is necessary to provide for a balancing member of elastic type, such as is shown for example in Figures 1 and 2. The use of a balancing member is also required when the reaction of the fluid distributing members of a turbine is nearly constant (as for instance in Pelton turbines); and also when the shape of the lever 13 in Fig. 1 is not exactly suitable.

In the following example the case has been considered where the speed of operation is independent of the load. When on the contrary a regulation is desired such that the speed varies with the load, then it is sufficient to modify the shape of the cam lever 13.

The members numbered from 1 to 13 correspond to similar members of Figs. 1 and 2.

The cam lever 13 is pivoted at one end on shaft 42 of support 43.

The other end of the lever 13 is shown as pivoted to a cup 44, biased spring 45, which abuts a second cup 46 pivotal on support 47. The carrier 6 through rod 48 controls the members governing the admission of actuating fluid into the motor.

The operation of this device is similar to that of the first modification, so that discussion thereof may be omitted.

With reference to Figs. 1 and 2, instead of balancing the carrier 6 by the system disclosed, it is sufficient for this particular purpose to balance it by a common dynamometer, or by means of weights, so that it is possible to know for every position of carrier 6 exactly what force is to be exercised by shaft 5 on its supports in order to balance the dynamometer. In such manner it is possible to calculate the driving torque, and by measuring with a revolution counter the speed of the motor, to find its power.

Having now particularly described and ascertained the nature of my said invention and in what manner the same is to be performed, I declare that what I claim is—

1. An automatic governor for shafting, comprising a pinion fast to the driving shaft, a driven gear fast to the driven shaft, planet gears fast on a third shaft and meshing with the pinion and driven gear respectively, a carrier in which said planet gears are pivotally mounted, a shaft across one end of said carrier having a roller loosely fitted thereon, a pivoted lever bearing against said roller, and a spring urging said lever into contact with said roller, variations in load demand by said driven shaft causing a rocking of said carrier into a new equilibrium position, movement in one direction of said carrier being resisted by said spring.

2. An automatic governor for shafting, comprising a pinion fast to the driving shaft, a driven gear fast to the driven shaft, planet gears fast on a third shaft and meshing with the pinion and driven gear respectively, a carrier in which said planet gears are pivotally mounted, a shaft across one end of said carrier having a roller loosely fitted thereon, a pivoted lever bearing against said roller, a cup pivoted at one end of said lever, a second cup pivoted to a support, a spring between said cups, forcing said lever against said roller, variations in load demand by said driven shaft causing movement of said carrier into a new equilibrium position, movement of the carrier in one direction being progressively resisted by said lever and spring.

3. An automatic governor for shafting, comprising a pinion fast to the driving shaft, a driven gear fast to the driven shaft, planet gears fast on a third shaft and meshing with the pinion and driven gear respectively, a carrier in which said planet gears are pivotally mounted, a shaft across one end of said carrier having a roller loosely fitted thereon, a pivoted lever bearing against said roller, a cup pivoted at one end of said lever, a second cup pivoted to a support, a spring between said cups, forcing said lever against said roller, variations in load demand by said driven shaft causing movement of said carrier into a new equilibrium position, movement of the carrier in one direction being progressively resisted by said lever and spring, and a link extending from said carrier to fuel-supply-regulating means for the machine energizing the drive shaft.

LUIGI FILIPPO BRAGA.